A. L. GENTER.
FILTERING APPARATUS.
APPLICATION FILED MAR. 11, 1916.
1,212,933.
Patented Jan. 16, 1917.
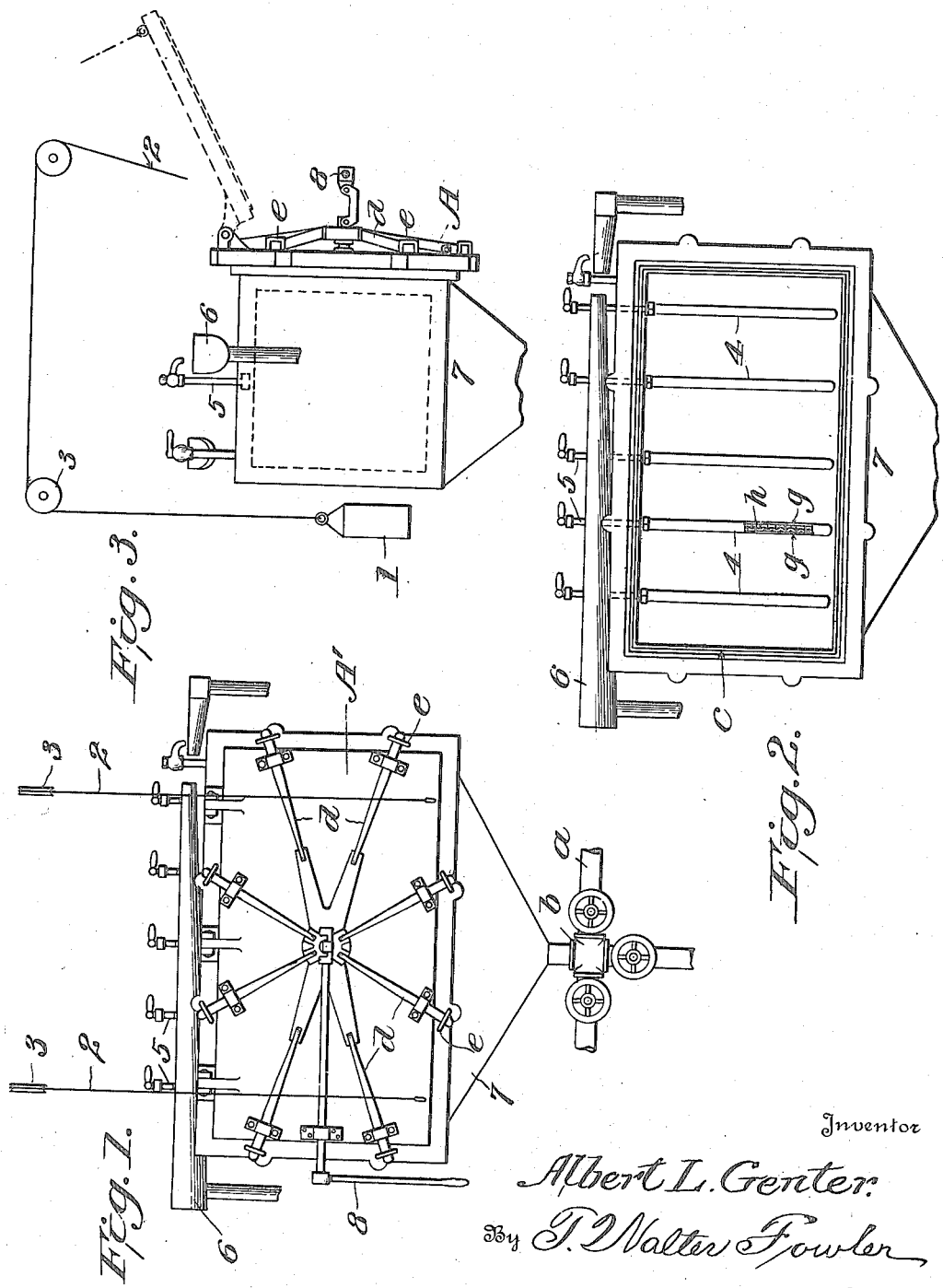

UNITED STATES PATENT OFFICE.

ALBERT LEGRAND GENTER, OF SALT LAKE CITY, UTAH, ASSIGNOR TO KELLY FILTER PRESS COMPANY, OF SALT LAKE CITY, UTAH, A CORPORATION OF UTAH.

FILTERING APPARATUS.

1,212,933.   Specification of Letters Patent.   Patented Jan. 16, 1917.

Application filed March 11, 1916. Serial No. 83,607.

*To all whom it may concern:*

Be it known that I, ALBERT L. GENTER, a citizen of the United States, residing at Salt Lake City, in the county of Salt Lake and State of Utah, have invented certain new and useful Improvements in Filtering Apparatus, of which the following is a specification.

My invention relates to certain new and useful improvements in filtering apparatus and particularly the pressure filter type thereof designed for separating the liquid from the solid constituents of a solution, and which solution may be mineral bearing slimes, or the solutions obtainable from the sugar or chemical industries, or from other sources; and my invention consists of the parts and the constructions, arrangements and combinations of parts which I will hereinafter describe and claim.

In the accompanying drawings forming part of this specification and in which similar reference characters indicate like parts in the several views; Figure 1 is a side elevation of a filtering apparatus embodying my invention. Fig. 2 is a similar view showing the head removed. Fig. 3 is an end view.

In carrying out my invention I construct a shell or casing of any desired material and dimensions and I may give it any cross-sectional design. In the illustrated embodiment of my invention, the shell or casing is rectangular and comprises permanent parallel ends, a permanent and an open side and a top and bottom, 7, the bottom being substantially funnel-shaped or inclining from the sides and ends to a central point from which leads a solution supply pipe, *a*, having a controlling valve. A union, *b*, on the supply pipe provides for the coupling thereto of other valve controlled pipes, for supplying the shell or casing with wash water, compressed air or other fluid as commonly practised in the working of filter presses and which operations are well known and form no essential part of the present invention; hence detailed description of the same appear to be unnecessary.

The open side of the shell or casing is closable by a suitable head, A', which is hingedly secured at its upper edge to the shell or casing and is adapted to close into or tightly against the open side of the shell or casing and to be held securely locked against a suitable gasket, *c*, in the contiguous face of the shell during the filtering operation, this being accomplished by some well known and appropriate head-locking mechanism, herein shown as comprising radial levers, *d*, on the head engaging loops or U-bolts, *e*, on the shell or casing, and an operating hand lever, 8, such mechanism being similar to that described in the Kelly Patent No. 1,015,961, dated January 30, 1912, and not claimed as my invention.

The lower free end or side of the hinged head is connected to a rope or equivalent flexible connection, 2, which passes over appropriate guide pulleys, 3, and has its opposite end connected to a counterweight, 1, by which the head, when unlocked, will be lifted into substantially the dotted position shown in Fig. 3, to fully open the side of the shell and give access to the interior of the same and to the contained filter agents, 4.

The character of the filter agents used is unimportant, but the construction usually employed in the filter presses comprises so-called open-leaf filters having flexible filtering sides, *g*, and an interposed woven wire or foraminous backing, *h*.

The filter leaves, 4, in the present instance are of a design which makes them conform to the general design of the shell or casing but the style of filtering leaf or frame may be other than shown without affecting the scope of the present invention.

Each filter leaf has an individual outlet pipe, 5, for the filtrate which is forced to the interior of the leaf or frame, and each outlet extends through the top of the shell or casing and is valve-controlled and is designed to deliver into an appropriate launder, 6 for such further treatment as the filtrate requires.

From the foregoing it will be manifest that one side of the filter shell or casing is secured by hinges to the top of the main portion of the casing and may be opened or closed as desired in a very simple manner. The sloping of the bottom of the shell or casing permits the clean draining of the shell of any solution remaining therein after the function of the filter leaves or frames has become impaired by reason of the solids accumulating on the filtering sides of the leaves and it is necessary to open the press and remove the filter frames, or to wash the cake to recover any retained values, it being understood that the several operations of filling the shell with solution, draining therefrom unfiltered excess solution, holding the caked material on the filter leaves with slight fluid pressure, filling the shell or casing with wash water or solution and again draining, are intended to be carried out in the press illustrated and that these operations are well known in the art and that they are not claimed as my invention.

Having thus described my invention what I claim as new and desire to secure by Letters Patent is:—

A filter press comprising a shell or casing of substantially rectangular form having permanent ends and one permanent side and a top; a bottom inclining from the sides and ends to a central point; a pipe connecting with the lowest point of the bottom having a plurality of valve-controlled branches, said shell or casing adapted to inclose filter mediums each having a valve-controlled filtrate outlet and said casing having only one open side; a head forming a closure for the open side of the casing and hingedly secured thereto along its upper longitudinal edge; a locking mechanism for securing the head in closed position against the open side of the casing; and a counterweight connected to the free side of said head adapted to elevate the head about its hinged connection when the locking mechanism is released.

In testimony whereof I affix my signature.

ALBERT LEGRAND GENTER.